(12) United States Patent
Robinson et al.

(10) Patent No.: US 7,350,097 B2
(45) Date of Patent: Mar. 25, 2008

(54) METHOD FOR RECOVERING CONTROL OF A CONTINUALLY RESETTING CONTROL MODULE

(75) Inventors: Timothy A. Robinson, Avon, IN (US); James H. Stewart, Gulfport, MS (US)

(73) Assignee: General Motors Corporation, Detroit, MI (US)

( * ) Notice: Subject to any disclaimer, the term of this patent is extended or adjusted under 35 U.S.C. 154(b) by 388 days.

(21) Appl. No.: 11/041,749

(22) Filed: Jan. 24, 2005

(65) Prior Publication Data

US 2006/0168468 A1 Jul. 27, 2006

(51) Int. Cl.
G06F 11/00 (2006.01)

(52) U.S. Cl. .................. 714/2; 714/2; 714/5

(58) Field of Classification Search .......... 701/39, 701/36, 99, 29; 714/2, 5
See application file for complete search history.

(56) References Cited

U.S. PATENT DOCUMENTS

| | | | | |
|---|---|---|---|---|
| 3,899,772 A | * | 8/1975 | Mead et al. | 340/10.51 |
| 4,245,315 A | * | 1/1981 | Barman et al. | 701/114 |
| 6,639,511 B2 | * | 10/2003 | Haruna et al. | 340/426.13 |
| 6,957,135 B2 | * | 10/2005 | Okada et al. | 701/33 |
| 7,012,993 B2 | * | 3/2006 | Alton | 379/26.01 |
| 7,149,915 B2 | * | 12/2006 | Matsuoka et al. | 713/502 |
| 2005/0203673 A1 | * | 9/2005 | El-Hajj et al. | 701/1 |
| 2006/0168468 A1 | * | 7/2006 | Robinson et al. | 714/5 |

OTHER PUBLICATIONS

A simple electronic starter capable of end-of-life protection for fluorescent lamps, In-Seon Yeo; Dong-Ho Lee; Sang-Bin Song; Applied Power Electronics Conference and Exposition, 1999. APEC '99. Fourteenth Annual, vol. 1, Mar. 14-18, 1999 pp. 473-479 vol. 1, Digital Object Identifier 10.1109/APEC.1999.749724.*

A controller for plasma motion in a Tokamak based on model estimation, Emaami, M.; Wood, H.C.; Skarsgard, H.M.; Industrial Electronics, IEEE Transactions on, vol. 37, Issue 4, Aug. 1990 pp. 317-322, Digital Object Identifier 10.1109/41.103419.*

(Continued)

*Primary Examiner*—Cuong Nguyen

(57) ABSTRACT

A method for recovering control of a continually resetting control module is provided. The method recovers control by monitoring a vehicle's communication links for a very short period each time the boot program starts and before control is passed to the application program. Alternatively, control may also be recovered using a running reset counter (RSC) that increments every time the boot program is entered via an abnormal condition. After recovering control, the control module can communicate with an external tool to diagnose and/or reprogram the control module and thereby prevent continual reset.

8 Claims, 4 Drawing Sheets

OTHER PUBLICATIONS

A fluorescent lamp electronic ballast for railway applications based on low cost microcontroller, Alonso, J.M.; Cardesin, J.; Calleja, A.J.; Rico-Secades, M.; Garcia, J.; Industry Applications Conference, 2003. 38th IAS Annual Meeting. Conference Record of the, vol. 1, Oct. 12-16, 2003 pp. 523-530 vol. 1.*

Detecting and minimizing potential impacts from valve hall fires, Custer, R.L.P.; Demarest, D.M.; Dobson, P.H.; Donahue, J.A.; Power Delivery, IEEE Transactions on, vol. 7, Issue 1, Jan. 1992 pp. 281-286, Digital Object Identifier 10.1109/61.108919.*

Automation of reciprocating gas engine compressor packages using programmable logic controllers, Goff, W.H.; Petroleum and Chemical Industry Conference, 1989, Record of Conference Papers.. Industrial Applications Society, 36th Annual, Sep. 11-13, 1989 pp. 181-187, Digital Object Identifier 10.1109/PCICON.1989.77883.*

Selective signalling system, Hudson, W.J., Jr.; Vehicular Technology Conference, 1966. 17th IEEE vol. 17, Dec. 1-2, 1966 pp. 95-100.*

* cited by examiner

METHOD FOR RECOVERING CONTROL OF A CONTINUALLY RESETTING CONTROL MODULE

TECHNICAL FIELD

The present invention is drawn to a method for recovering control of a continually resetting control module.

BACKGROUND OF THE INVENTION

Occasionally, a control module hardware or software failure occurs that causes the processor to continually reset. During a continual reset the boot program executes a startup command and thereafter transfers control to an application program, then an event causes the processor to reset which transfers control back to the boot program such that the sequence continually repeats. This sequence of events is difficult to stop, and since it is a very rapid cycle, the control module cannot communicate with an external tool to allow diagnosis of the issue and/or reprogramming of the problem area. This problem is particularly difficult to diagnose in sealed control modules or control modules that are inaccessible such as those mounted inside an engine or transmission.

SUMMARY OF THE INVENTION

According to a preferred embodiment of the present invention, control of a continually resetting control module is recovered by monitoring the communication links for a very short period each time the boot program starts and before control is passed to the application program. If a unique recovery message is received within the time period, then the boot program continues monitoring communications for an additional time period. If a second recovery message is received on the same communications link within the second time period, the boot program enters the monitor communications mode. A response is preferably sent for each recovery message acknowledging receipt thereof. Accordingly, the control module can communicate with an external tool to diagnose and/or reprogram the control module.

According to an alternate embodiment of the present invention, control of a continually resetting control module is recovered using a running reset counter (RSC) that increments every time an unexpected event causes the control module to reset. The RSC is preferably located in SRAM and includes built-in validity checking by requiring that the RSC's compliment (RSCC) is stored in a separate SRAM location. The RSC and RSCC are compared against a value that is preferably located in the application program header each time the boot program starts. If the RSC exceeds the limit programmed into the application program header, the boot program enters the monitor communications mode instead of transferring control to the application program. In this manner, the control module can communicate with an external tool to diagnose and/or reprogram the control module.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
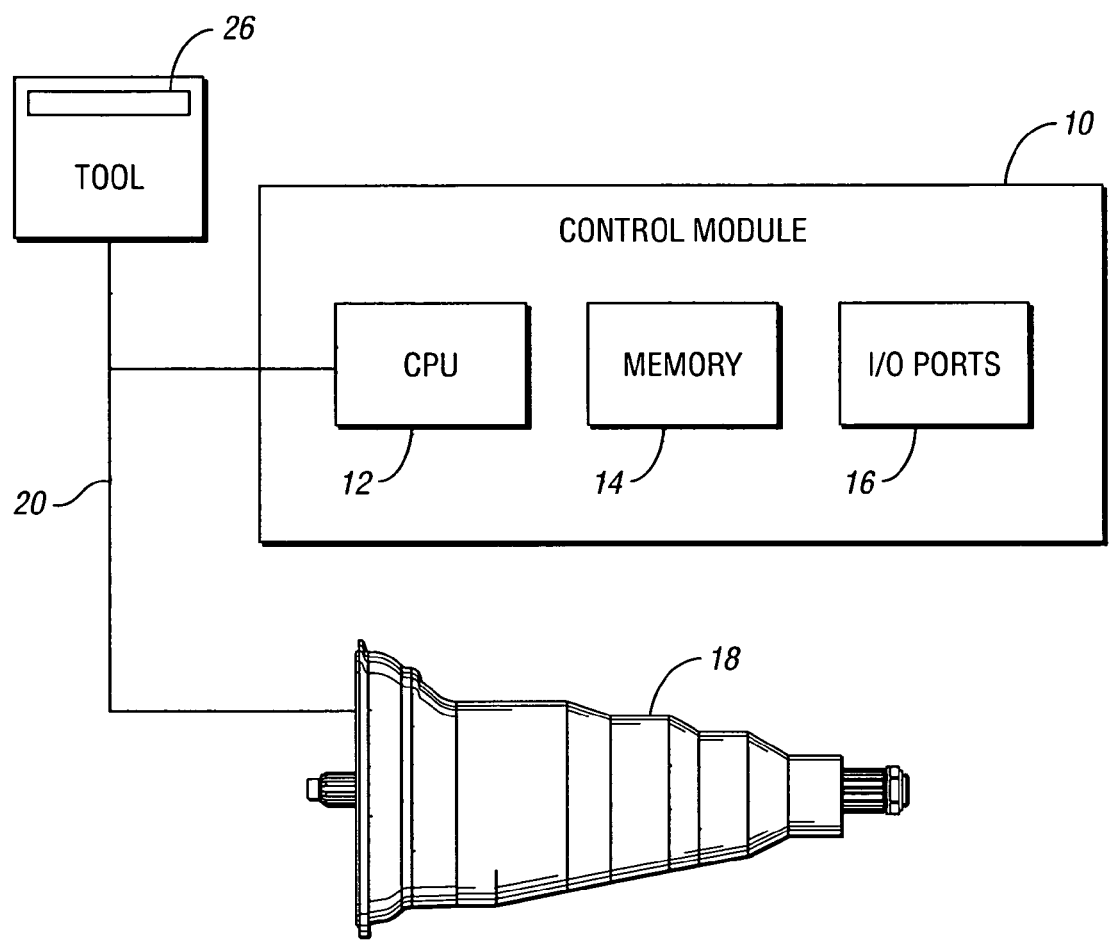
FIG. 1 is a schematic illustration of a control module in accordance with one aspect of the invention.

Referring to the drawings, wherein like reference numerals refer to like components, FIG. 1 shows a control module 10 having a microprocessor 12, a memory device 14 and one or more input/output ports 16. The control module 10 will hereinafter be described as controlling one or more systems of a vehicle (not shown). Such systems may include, but are not limited to, a braking system; a fuel storage system; an engine; a heating, ventilating and air conditioning system; a transmission; etc. The memory device 12 will hereinafter be described as SRAM 12; however, it should be appreciated that any number of alternate memory devices may be envisioned. For purposes of this disclosure, the control module 10 is shown connected to a vehicle's transmission 18 through one of the vehicle's internal communication links 20.

Figure 2:
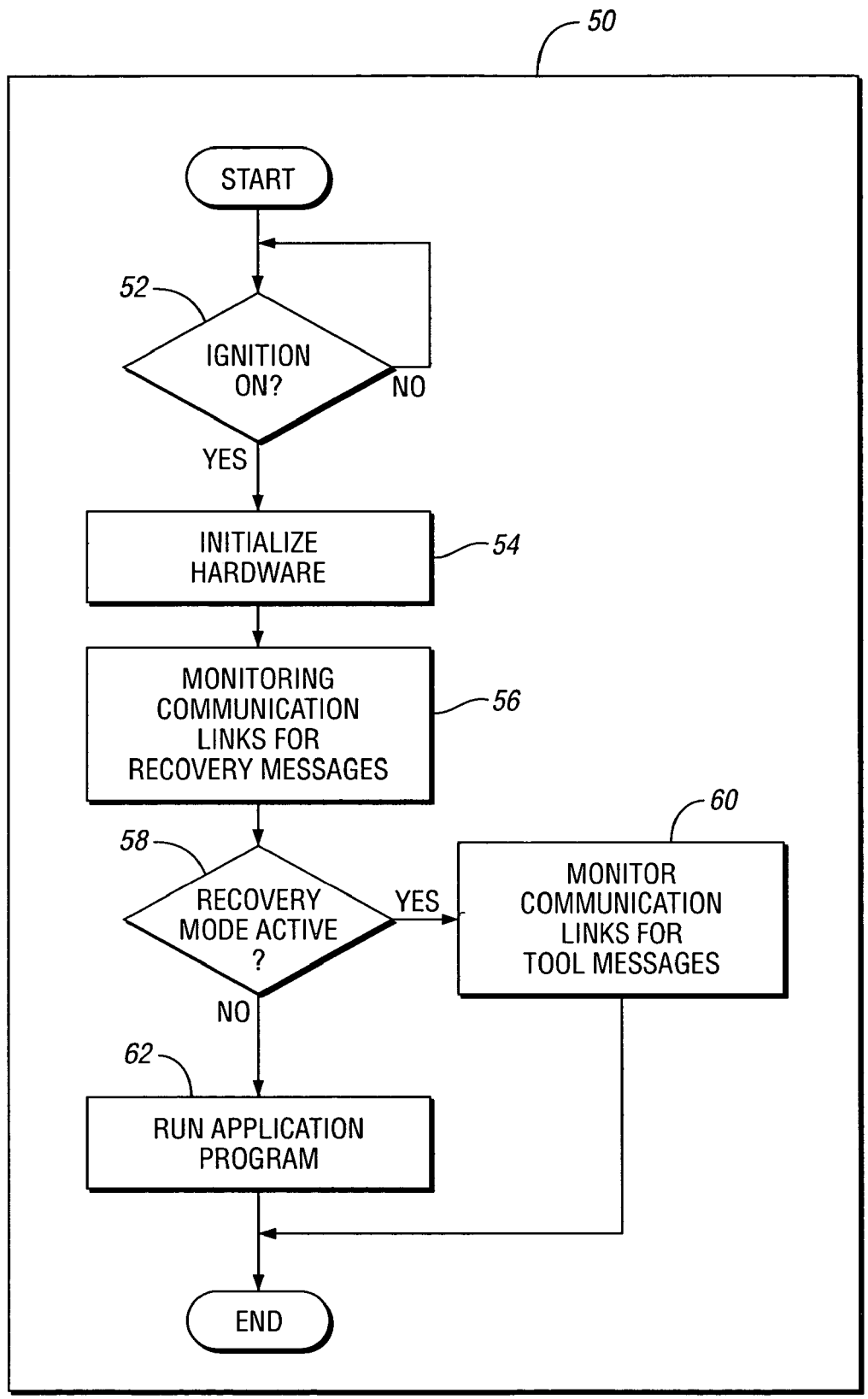
FIG. 2 is a block diagram illustrating a method according to a preferred embodiment of the present invention.
Figure 3:
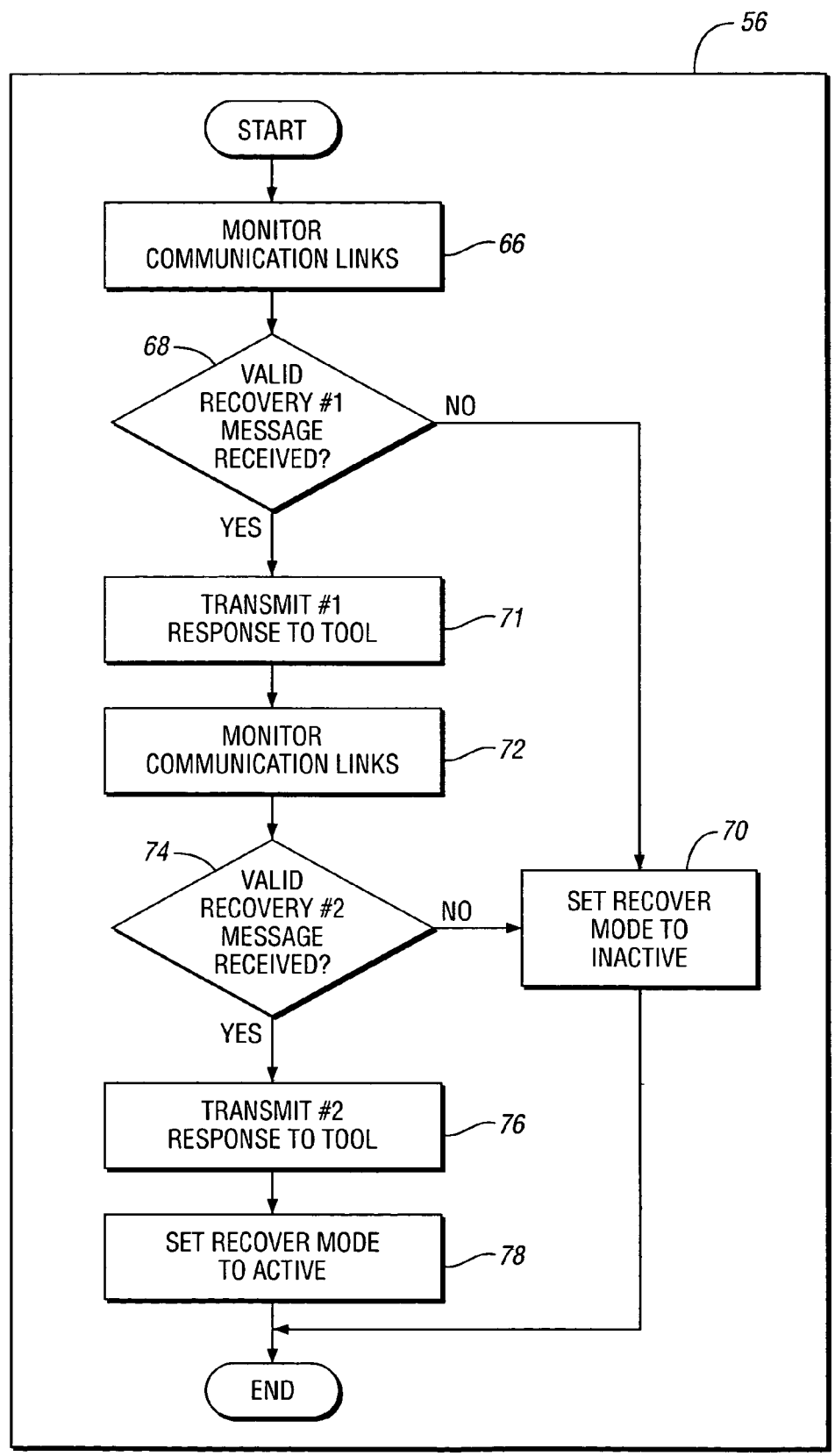
FIG. 3 is a block diagram illustrating a step of the method of FIG. 2.

FIGS. 2-3 depict a method according to a preferred embodiment of the present invention wherein control of a continually resetting control module is recovered by monitoring the vehicle communication links 20 for a very short period each time the boot program starts and before control is passed to the application program. This method is particularly well adapted to applications in which the control module's input/output ports 16 are inaccessible such as in the case of a transmission control module or engine control module. Each of the blocks shown in FIGS. 2-3 represent one or more steps performed by the microprocessor 12.

Referring to FIG. 2, a method 50 for recovering control of a continually resetting control module (also referred to herein as algorithm 50) is shown. At step 52, the algorithm 50 checks to see if the vehicle's ignition (not shown) is on as preferably indicated by receipt of a vehicle ignition signal. If the ignition is not on, step 52 is repeated. If the ignition is on, the algorithm 50 proceeds to step 54. At step 54, hardware such as the microprocessor 12 and memory device 14 is initialized. At step 56, the algorithm 50 checks for recovery messages as will be described in more detail hereinafter. At step 58, the algorithm 50 checks to see if the recover mode is active. If the recover mode is active, the algorithm proceeds to step 60 at which the communication links 20 are monitored for a tool message from an external tool 26 such as a service tool, computer, diagnostic equipment, etc. The tool message of step 60 typically interrogates and/or reprograms the control module 10 to prevent continual reset. If the recover mode is not active, the algorithm 50 proceeds to step 62 at which the application program is run.

Referring to FIG. 3, step 56 at which the algorithm 50 checks for recovery messages is shown in more detail. A recovery message is a message sent from the external tool 26 indicating that the processor is continually resetting and that steps should be taken to recover control. The recovery message may be sent on one of the vehicle's internal communication links 20 if the control module 10 is otherwise inaccessible. To ensure that recovery mode is not inadvertently initiated, a second recovery message is preferably implemented to validate the first such message. It should, however, be appreciated that the second recovery message is precautionary and not a requirement.

At step 66, the algorithm 50 monitors one of the vehicle communication links 20 for a first predetermined amount of time to allow for recovery message transmission. At step 68, the algorithm 50 determines whether a first valid recovery message has been received. If the first valid recovery message has not been received at step 68, the algorithm 50 proceeds to step 70 at which the recover mode is set to inactive. If the first valid recovery message has been received, the algorithm 50 proceeds to step 71. At step 71, a response is sent to the tool 26 indicating that the first recovery message has been received. This response may be sent on the vehicle's internal communication links if the control module 10 is otherwise inaccessible. At step 72, the algorithm 50 monitors one of the vehicle communication links 20 for a second predetermined amount of time to allow the tool 26 to respond. At step 74, the algorithm 50 determines whether a second valid recovery message has been received. If the second valid recovery message has not been received, the algorithm 50 proceeds to step 70 at which the recover mode is set to inactive. If the second valid recovery message has been received, the algorithm 50 proceeds to step 76. At step 76, a response to the second valid recovery message is transmitted to the tool 26. At step 78, the recover mode is set to active.

Figure 1A:
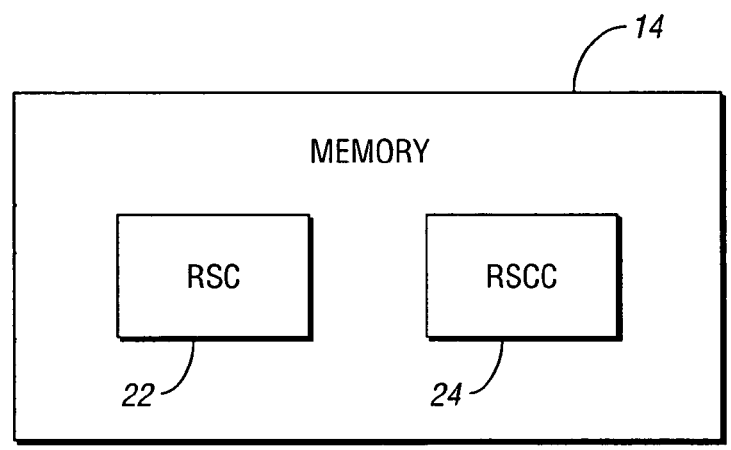
FIG. 1a is a detailed schematic illustration of a memory device of the control module of FIG. 1.
Figure 4:
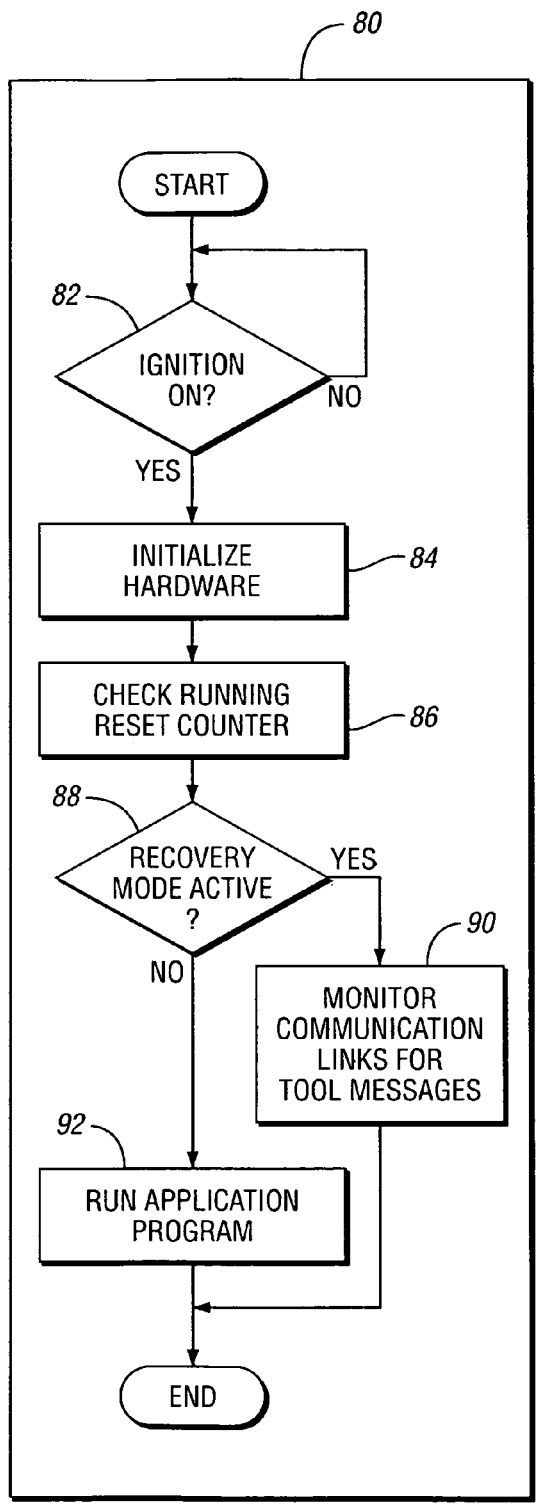
FIG. 4 is a block diagram illustrating a method according to an alternate embodiment of the present invention.
Figure 5:
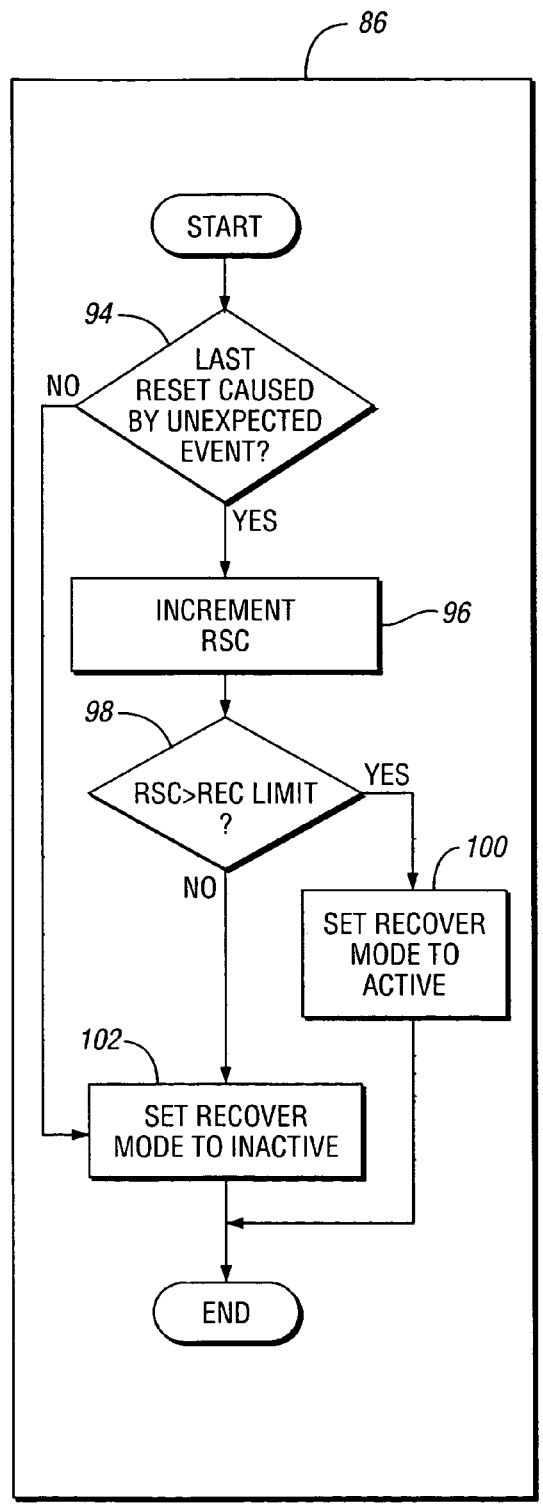
FIG. 5 is a block diagram illustrating a step of the method of FIG. 4.

FIGS. 4-5 depict a method according to an alternate embodiment of the present invention wherein control of a continually resetting control module is recovered using a running reset counter (RSC). Therefore, according to the alternate embodiment described hereinafter, the SRAM 14 includes a running reset counter (RSC) 22 (shown in FIG. 1*a*) stored in a first memory location and the RSC 22's compliment (RSCC) 24 (shown in FIG. 1*a*) stored in a separate memory location. As with FIGS. 2-3, each of the blocks shown in FIGS. 4-5 represent one or more steps performed by the microprocessor 12.

Referring to FIG. 4, a method 80 for recovering control of a continually resetting control module (also referred to herein as algorithm 80) is shown. At step 82, the algorithm 80 checks to see if the vehicle's ignition (not shown) is on as preferably indicated by receipt of a vehicle ignition signal. If the ignition is not on, step 82 is repeated. If the ignition is on, the algorithm 80 proceeds to step 84. At step 84, hardware such as the microprocessor 12 and memory device 14 is initialized. At step 86, the algorithm 80 checks the RSC 22 as will be described in more detail hereinafter. At step 88, the algorithm 80 checks to see if the recover mode is active. If the recover mode is active, the algorithm proceeds to step 90 at which the communication links 20 are monitored for a message from the tool 26. The message of step 90 typically interrogates and/or reprograms the control module 10 to prevent continual reset. If the recover mode is not active, the algorithm 80 proceeds to step 92 at which the application program is run.

Referring to FIG. 5, step 86 at which the algorithm 80 checks the RSC 22 is shown in more detail. In the event the SRAM 14 memory location at which the RSC 22 is stored becomes corrupted, the RSCC 24 is stored in a separate location and may be implemented in place of the RSC 22. It should, however, be appreciated that the RSCC 24 is precautionary and not a requirement.

At step 94, the algorithm 80 determines if the most recent reset was caused by an unexpected event. An "unexpected event" for purposes of this disclosure includes any event not identified by the microprocessor 12 as being included in a predefined list of expected events such as, for example, turning off the vehicle. If the last reset was not caused by an unexpected event, the algorithm 80 proceeds to step 102 wherein the recover mode is set to inactive. If the last reset was caused by an unexpected event, the algorithm 80 proceeds to step 96 wherein the RSC 22 is incremented by a predefined amount. At step 98, the algorithm 80 determines whether the value of the RSC 22 is greater than a predefined RSC limit that is preferably located in the application program header. The RSC limit is preferably set at a relatively high value, for example one thousand, to minimize the risk of inadvertent recover mode activation. If the value of the RSC 22 is greater than the predefined RSC limit, the algorithm 80 proceeds to step 100 wherein the recover mode is set to active. If the value of the RSC 22 is not greater than the predefined RSC limit, the algorithm 80 proceeds to step 102 wherein the recover mode is set to inactive.

The steps shown in FIGS. 1-5 and described herein need not be performed in the order shown, unless otherwise indicated herein.

While the best modes for carrying out the invention have been described in detail, those familiar with the art to which this invention relates will recognize various alternative designs and embodiments for practicing the invention within the scope of the appended claims.

The invention claimed is:

1. A method for recovering control of a continually resetting control module comprising:
   receiving a vehicle ignition signal;
   initializing control module hardware;
   monitoring a vehicle communication link for receipt of at least one recovery message;
   after said monitoring step, activating a recover mode if said at least one recovery message is received;
   after said monitoring step, deactivating said recover mode if said at least one recovery message is not received;
   determining whether said recover mode is active;
   after said determining step, monitoring said vehicle communication link for a tool message if said recover mode is active, wherein said tool message is adapted to prevent continual reset; and
   after said determining step, running an application program if said recover mode is not active.

2. The method of claim 1, wherein said monitoring for at least one recovery message occurs for a first predetermined amount of time to allow transmission of said at least one recovery message.

3. The method of claim 2, further comprising transmitting a response to said at least one recovery message.

4. The method of claim 3, wherein said at least one recovery message includes a first and second recovery message.

5. The method of claim 4, wherein said monitoring for at least one recovery message occurs for a second predetermined amount of time to allow transmission of said second recovery message.

6. The method of claim 5, further comprising transmitting a response to said second recovery message.

7. The method of claim 2, wherein said at least one recovery message comprises a plurality of recovery messages.

8. The method of claim 7, further comprising transmitting a response to each of said plurality of recovery messages after said monitoring step.

* * * * *